(12) United States Patent
Polezhaev et al.

(10) Patent No.: US 9,648,882 B2
(45) Date of Patent: May 16, 2017

(54) INSTALLATION FOR LIQUID DOUGH GOODS PREPARATION FOR BAKING

(71) Applicants: Sergey Victorovich Polezhaev, Moscow (RU); Petr Vladimirovich Mochalov, Moscow (RU); Pavel Sergeevich Milyk, Moscow (RU)

(72) Inventors: Sergey Victorovich Polezhaev, Moscow (RU); Petr Vladimirovich Mochalov, Moscow (RU); Pavel Sergeevich Milyk, Moscow (RU)

(73) Assignee: ALMERICK HOLDINGS LTD., Nicosia (CY)

( * ) Notice: Subject to any disclaimer, the term of this patent is extended or adjusted under 35 U.S.C. 154(b) by 0 days.

(21) Appl. No.: 14/715,740

(22) Filed: May 19, 2015

(65) Prior Publication Data

US 2016/0338363 A1 Nov. 24, 2016

(51) Int. Cl.
| | | |
|---|---|---|
| *A23B 4/052* | (2006.01) | |
| *A47J 37/12* | (2006.01) | |
| *A21C 9/04* | (2006.01) | |
| *A23P 1/00* | (2006.01) | |
| *A21D 6/00* | (2006.01) | |
| *A23L 1/00* | (2006.01) | |
| *A21B 5/03* | (2006.01) | |
| *A21C 3/00* | (2006.01) | |
| *A21C 5/00* | (2006.01) | |

(52) U.S. Cl.
CPC .................. *A21B 5/03* (2013.01); *A21C 3/00* (2013.01); *A21C 5/006* (2013.01)

(58) Field of Classification Search
CPC ....... A21B 5/03; A21C 1/1425; A21C 1/1435; A21C 3/00; A21C 5/006
USPC ........... 99/334, 352, 353, 432, 450.1, 450.2; 426/61, 62, 391, 496, 503, 516
See application file for complete search history.

(56) References Cited

U.S. PATENT DOCUMENTS

| | | | | |
|---|---|---|---|---|
| 3,630,140 A | * | 12/1971 | Marrie ...................... | A21B 5/03 99/423 |
| 3,718,487 A | * | 2/1973 | Brunner ................. | A21C 5/006 99/353 |
| 4,083,296 A | * | 4/1978 | Mede ........................ | A21B 5/03 99/423 |
| 4,321,858 A | * | 3/1982 | Williams ............... | A21C 9/063 426/497 |

(Continued)

FOREIGN PATENT DOCUMENTS

| | | |
|---|---|---|
| RU | 2007143983 A | 6/2009 |
| RU | 2010129659 A | 1/2012 |

*Primary Examiner* — Dana Ross
*Assistant Examiner* — Lindsey C Staubach
(74) *Attorney, Agent, or Firm* — Lambert & Associates; Gary E. Lambert; David J. Connaughton, Jr.

(57) ABSTRACT

An apparatus for liquid dough goods preparation is provided. The device has a base formed of a vertical post and a horizontal beam attached to a top side of the post. A plurality of nipples are arranged along the post for dough dispensing. The nipples are directed at a baking surface for dispensing dough thereon. A dough leveling device is mounted on the horizontal beam. The leveling device has a blower with an outlet directed through the dough leveling device. In operation, as the dough is dispensed, air from the leveling device aids in a spreading and leveling of the dough on the baking surface.

9 Claims, 3 Drawing Sheets

(56) References Cited

U.S. PATENT DOCUMENTS

2011/0236552 A1\* 9/2011 Vink ..................... A21B 5/03
426/553

\* cited by examiner

INSTALLATION FOR LIQUID DOUGH GOODS PREPARATION FOR BAKING

BACKGROUND

Field of the Invention

This invention relates to the food industry and may be utilized in the automatic pancake and other product cooking systems for feeding and leveling liquid dough on a baking surface.

Related Art

A device is known containing a body with a drum mounted on it with heat elements on a horizontal shaft, a scrapers for cleaning the surface of the drum, a dough tank, a feed tray, the second drum with a heat element mounted parallel to the first drum and rotated inversely, a cutter located between the lower drum and the tray representing two parallel stainless steel plates, an electric blower for cooling the product and, in addition to, a liquid dough tank can be fitted with a mixer.

The disadvantage of this device is relatively low accuracy of dough leveling resulting in relatively low baked product quality.

The closest by its technical essence is a device for forming dough pieces prepared from the batter mass processed in the tank for receiving dough that comprises a set of tools that move and take several positions for ensuring sequential dough handling, wherein the tank and a set of tools are involved as the units reciprocally moving to and off each other, wherein a set of tools comprises dough spreading tank control aids, which are made in the form of a pressing plate and used for leveling dough by thickness while keeping an initial volume, individual dough molding aids to produce separate dough pieces, which are made in the form of partition walls evenly distributed within the same plane with the wall-to-wall cavities produced for forming dough pieces while the tank bottom and set of tools are reciprocally approached, thereby bringing the partition walls to the tank bottom, wherein the form of the partition wall end parts at every cavity has a tear-shaped boss profile to ensure regular extension of an upper dough surface layer and deposition of excess dough inside the above layer to be closed as long as the partition walls approach to the bottom of the tank, and dough pieces are completely separated when partition walls comes in contact with the tank bottom.

The disadvantage of such closest technical decision is relatively low dough leveling quality due to application of a pressing plate that comes in contact with dough. Any dough adhering to the plates do not allow to ensure its uniform thickness.

SUMMARY

The technical result of the apparatus of the present invention is achieved in development of the device that will ensure higher accuracy of dough leveling prior to baking, thus providing for higher quality baked products.

The apparatus contemplated herein is made in the form of a dough reception device, a dough delivery device, and a dough thickness leveling device. The apparatus contains a bearing body formed by a vertical post and a horizontal beam fixed to an upper part of the vertical post whereon the dough delivery device and the device for dough thickness leveling are mounted. The dough reception device is designed in the form of a stationary base, the upper part thereof is formed by the baking surface serving for dough reception before baking. The body vertical post is installed so as to enable movement along a horizontal guide above the baking surface. This movement may be by means of a reciprocating mechanism, a drive of the reciprocating mechanism is mounted on the stationary base. The dough delivery device is designed in the form of a group of liquid dough delivery nipples installed in a row and attached to the horizontal beam of the bearing body, connected to the tank for preliminary dough preparation. The dough leveling device contains a dough molder mounted on the horizontal beam parallel to the group of nipples installed in a row and designed in the form of a rectangular hollow frame structure positioned along the baking surface width and having a longitudinal slot in the lower part for aid delivery onto the baking surface of liquid dough, supplied out of the nipples. The leveling being achieved by air blown by the group of blowers mounted on the horizontal beam, though the leveling device and against the dough.

DETAILED DESCRIPTION

Figure 1:
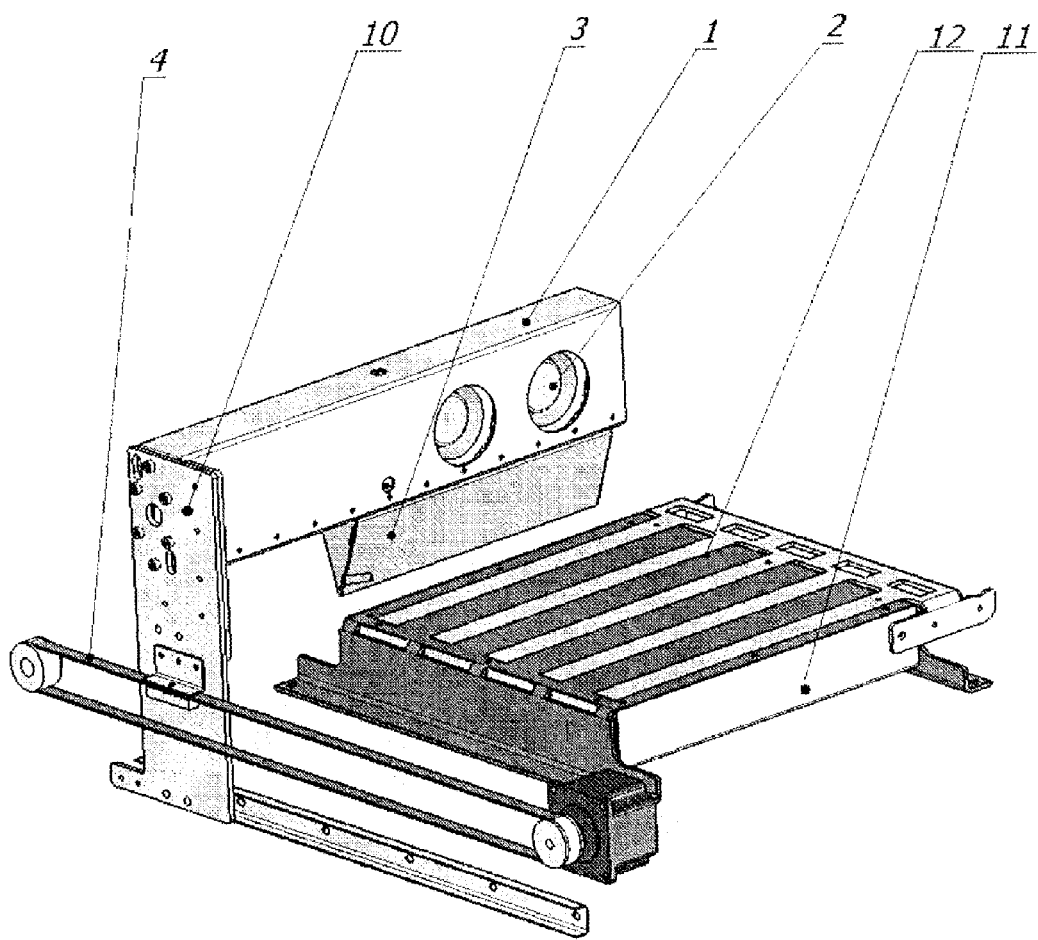
FIG. 1—provides a general view of the present invention.
Figure 2:
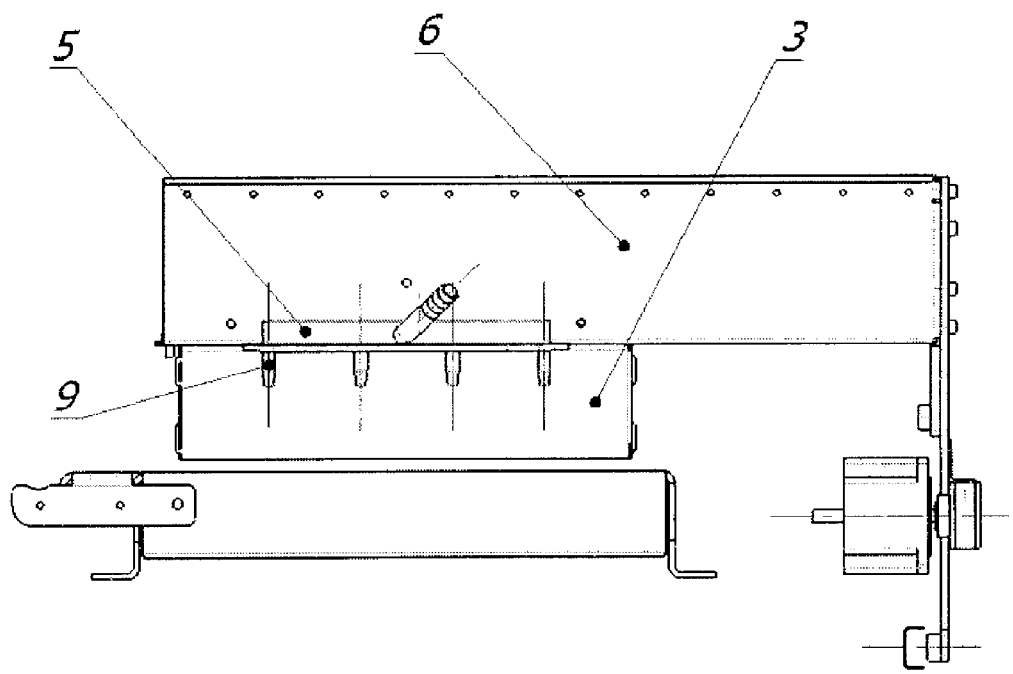
FIG. 2—provides a rear view of the present invention.
Figure 3:
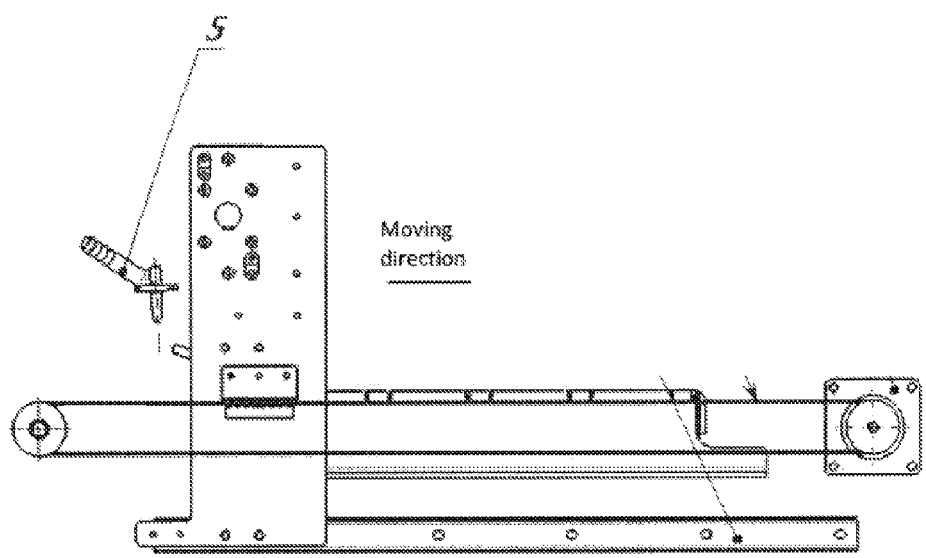
FIG. 3—provides a top view of the present invention.
Figure 4:
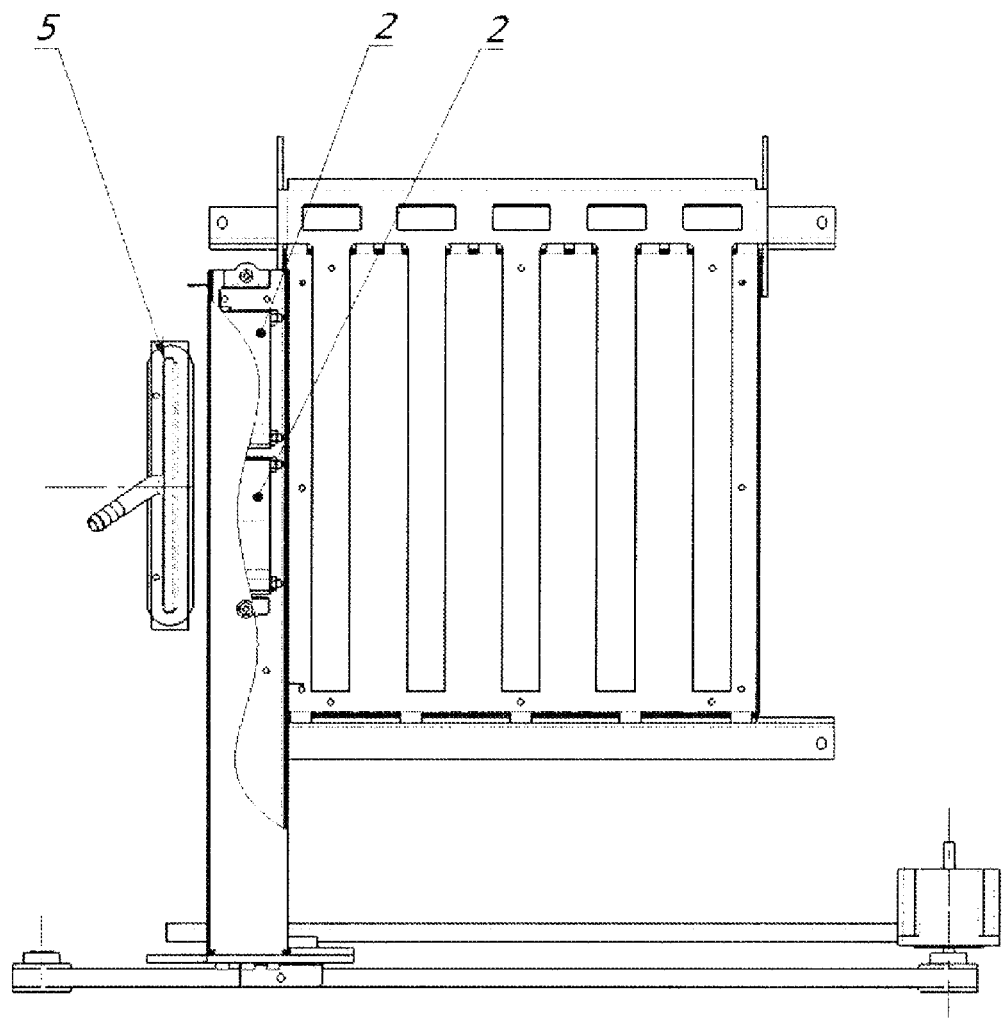
FIG. 4—provides a side view of the present invention.

This invention relates to the food industry and may be utilized in the automatic pancake and other product cooking systems for feeding and leveling liquid dough on a baking surface. The required technical result is achieved by improving accuracy of leveling in the apparatus that contains a dough reception device, a dough delivery device, and a dough thickness leveling, wherein the apparatus contains a bearing body formed by a vertical post and a horizontal beam fixed to an upper part of the vertical post, whereon the dough delivery device and the device for dough thickness leveling are mounted. The dough reception device is designed in the form of a stationary base, an upper part thereof is formed as a baking surface for dough reception before baking; the body vertical post is installed so as to enable its movement along a horizontal guide relative to the baking surface of the dough reception device. This movement may be by means of a reciprocating mechanism, a drive thereof is mounted on the stationary base. The dough delivery device may be designed in the form of a group of liquid dough delivery nipples installed in a row and attached to the horizontal beam of the bearing body, connected to the tank for preliminary dough preparation. The dough leveling device contains a dough molder mounted on the horizontal beam parallel to the group of nipples. The dough leveling device may be in the form of a rectangular hollow frame structure positioned along the baking surface width and having a longitudinal slot in the lower part for aiding delivery of liquid dough onto the baking surface. The liquid dough being supplied out of the nipples, and the blowers mounted on the horizontal beam forcing air through the dough leveling device towards the baking surface, thereby leveling the dough.

The components demonstrated in the drawings include: bearing body 1, group of blowers 2 (shown here as inlet nozzles of a group of centrifugal blowers), dough molder 3, reciprocating mechanism 4, group of the liquid dough delivery nipples 5, horizontal beam 6, linear guide 7, motor 8, outlets 9 of the liquid dough delivery nipples, vertical post 10, stationary base 11 with baking surface 12.

The apparatus for liquid dough goods preparation for baking comprises bearing body 1 formed by a vertical post and a horizontal beam 6 fixed to an upper part of the vertical post 10 whereon the dough delivery device made in the form of a stationary base 11 the upper part whereof is formed by the baking surface 12 serving for dough reception before baking. The body vertical post 1 is installed so as to enable movement along a horizontal guide above the baking surface 12 of the dough reception device by means of a reciprocating mechanism 4, a drive thereof is mounted on the stationary base 11.

The dough delivery device mounted in the apparatus for liquid dough goods preparation for baking comprises a group of liquid dough delivery nipples 5 installed in a row and attached on a horizontal beam 6 of the bearing body 1. The nipples 5 are connected to the tank for preliminary dough preparation (not shown in the drawings). The dough leveling device contains the dough molder 3 mounted on the horizontal beam 6 parallel to the group of nipples 5. The dough leveling device is designed in the form of a rectangular hollow frame structure positioned along the baking surface width 12. The dough leveling device has a longitudinal slot in the lower part for aiding delivery onto the surface of liquid dough, the dough being supplied out of the nipples 5. A group of blowers 2 are mounted on the horizontal beam 6 in a row along the baking surface width 12.

In use, this apparatus may be applied for processing any dough with its viscosity allowing spreading over a surface less any clumps. This apparatus can be controlled not only by completely automated computerized systems (configured to control all aspects of operation including dough release, leveling device control, movement, and the like), but also by manually operated devices, provided that the bearing body 1 with dough delivery and thickness leveling devices, a group of the row-mounted nipples 5 and dough molder 3 can be moved by hand.

If a bearing body 1 is moved, a group of nipples 5 feed dough to the baking surface 12. Molder 3 makes a dough layer level and evenly spread over a surface by means of the air flow supplied by the blowers 2 through a narrow outlet. On spreading and leveling dough, the body is brought to its original position to start baking the product, for example a pancake. Thereafter, the processes described are repeated.

Dough product is leveled and spread out by using a contact-free method thereby preventing, particularly, adhering to any mechanical leveling units with no irregularities produced thereof. Air flow can be adjusted by controlling blower blade rotary speed, for example, by changing voltage supply value depending on produced dough texture. In such a way, the required technical result is achieved thanks to introduction of proposed technical innovation to the known device—higher accuracy of dough leveling before baking, particularly, pancakes, since dough products do not mate with leveling aids preventing adherence to contact surfaces and ensuring higher level of baking quality and compliance with sanitary requirements.

The invention claimed is:

1. An apparatus for liquid dough preparation comprising:
   a body, the body comprising a vertical post and a horizontal beam, the horizontal beam attached to the vertical post at a top of the vertical post;
   a baking surface arranged below the horizontal beam;
   a blower mounted on the horizontal beam, an outlet of the blower in communication with and directed by a dough leveling device, the dough leveling device comprising a rectangular housing having an elongate opening along its length in a direction along a length of the horizontal beam; the elongate opening facing the baking surface, wherein the dough leveling device is configured to direct an air flow from the blower through the elongate opening to the baking surface to substantially level a quantity of dough;
   a dough delivery device mounted on the horizontal beam, the dough delivery device comprising a plurality of nipples directed towards the baking surface, the plurality of nipples arranged along the length of the horizontal beam; and
   wherein the vertical post of the body is horizontally movable relative to the baking surface along a horizontal guide.

2. The apparatus of claim 1 further comprising a motorized drive mounted on a base of the baking surface, the motorized drive providing mechanized movement of the vertical post relative to the baking surface.

3. The apparatus of claim 2 further comprising a computerized controller configured to control a dispensing of a dough through the plurality of nipples, activation of the blowers, and activation of the motorized drive.

4. The apparatus of claim 1 wherein the plurality of nipples are arranged approximately parallel with the elongate opening of the dough leveling device.

5. The apparatus of claim 1 further comprising a plurality of blowers.

6. The apparatus of claim 1 wherein the vertical post is movable and wherein the baking surface is stationary.

7. The apparatus of claim 1 wherein the baking surface is movable with respect to the vertical post.

8. The apparatus of claim 1 wherein the plurality of nipples are arranged in a row.

9. The apparatus of claim 1 wherein the dough leveling device is spaced apart from the baking surface.

* * * * *